United States Patent [19]
Bulthuis et al.

[11] B 3,986,141
[45] Oct. 12, 1976

[54] GAS DISCHARGE LASER

[75] Inventors: Kornelis Bulthuis; Johannes Van der Wal; Bram Johan Derksema, all of Eindhoven, Netherlands

[73] Assignee: U.S. Philips Corporation, New York, N.Y.

[22] Filed: Feb. 14, 1975

[21] Appl. No.: 549,931

[44] Published under the second Trial Voluntary Protest Program on January 20, 1976 as document No. B 549,931.

[30] Foreign Application Priority Data
Feb. 28, 1974  Netherlands ................... 7402691

[52] U.S. Cl. .................... 331/94.5 C; 331/94.5 D
[51] Int. Cl.² ............................................. H01S 3/02

[58] Field of Search .................................. 331/94.5

[56] References Cited
UNITED STATES PATENTS
3,656,067  4/1972  Zavodny .................... 331/94.5 C

*Primary Examiner*—William L. Sikes
*Attorney, Agent, or Firm*—Frank R. Trifari

[57] ABSTRACT

A gas discharge laser in which a plane parallel transparent plate whose normal encloses an angle with the axis of the laser tube equal to the Brewster angle is arranged in at least one of the ends of the laser tube. The plate is secured to the adjacent reflector so that the plate can easily be replaced.

4 Claims, 5 Drawing Figures

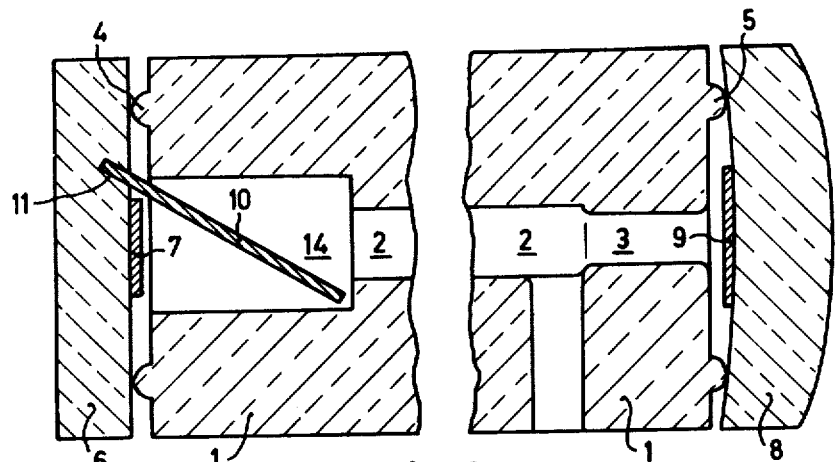

GAS DISCHARGE LASER

The invention relates to a gas discharge laser for generating stimulated emission and having reflectors which are connected directly to the ends of the part of the gas discharge tube which forms the laser tube. At least one of the reflectors passes a coherent beam, a plane parallel transparent plate the normal of which encloses an angle with the axis of the laser tube equal to the Brewster angle is arranged in at least one of the ends.

Such a gas discharge laser is known from Dutch Patent application No. 6,908,341. In that Patent Application the plate is provided in a cylindrical space the axis of which coincides with that of the laser tube and which space is present in one of the ends. The plate is fixed in the space by means of adhesive, cement or sealing glass.

Light which impinges on the plate and is polarized in the plane of incidence passes through the plate without losses as a result of Fresnel reflections. By arranging such a plate in the laser tube only oscillations of said linearly polarized light will occur.

Although it is possible to obtain polarization of the light beam emerging from the laser by means of a polarizer arranged outside the laser tube, at least half of the coherent power is lost in this case and in addition the polarizer should be fixed in an efficacious manner relative to the laser tube.

The provision and fixing of the plate in the laser tube in the space as described in the said Dutch Patent application No. 6,908,341 is rather complicated. Furthermore, the plate is difficult to replace. Such replacement may be necessary as a result of, for example, pollutions, defects or damages.

In the Dutch Patent application No. 7,311,751 the plate is secured by enclosing it between two cylindrical tubes which are slid in the said cylindrical space. One of the cylindrical tubes is provided in the capillary in a clamping manner so that the plate is fixed in the laser tube. This method of connection is cumbersome and too large a number of components are necessary as a result of which this method is less desirable for use on a large scale in simple compact lasers.

It is the object of the invention to provide a cheap gas laser which is easy to manufacture and which does not exhibit the above-mentioned drawbacks.

A gas discharge laser according to the invention is characterized in that the plate is secured to one of the reflectors. An advantage is that the connection can be carried out outside the laser tube. In the case of a non-readily operating plate, same may be replaced by replacing the reflector with the plate, which can be done rapidly.

The connection of the plate to the reflector can be carried out in a simple manner by bending one end of the plate in such manner that it engages the reflector and is connected thereto. The connection may be carried out with an adhesive, sealing glass or the like. This is a very simple manner of connection which can readily be automated.

In another form the reflector comprises a cavity in which one end of the plate is sunk and is then secured by means of an adhesive or sealing glass and the like. In this manner a very rigid connection is obtained between the plate and the reflector.

In still another form at least a part of the circumference of the plate is supported by means of one or more supporting means which are secured to the reflector. In this manner a very rigid construction is obtained.

In order that the invention may be readily carried into effect, it will now be described in greater detail, by way of example, with reference to a drawing of which FIG. 1 is a diagrammatic cross-sectional view of a laser according to the invention, FIGS. 2, 3 and 4 show the connection of the plate to the reflector, and FIG. 5 shows the connection of the plate to the reflector by means of supporting means.

Referring now to FIG. 1, reference numeral 1 denotes a hard glass capillary having a cavity 2, diameters 9 and 1.7 mm. respectively, length 250 mm. At 3 the diameter is reduced to 1.35 mm and at 14 it is increased to 1.8 mm. Moulded edges 4 and 5 having blunt double conical engaging edges as described in the Dutch Patent application No. 7,210,089, support the reflector 6 which has a dichroic multilayer 7 and a concave reflector 8 having a dichroic layer 9. The outside of the reflector 8 is ground so as to be convex in order to collimate the emerging beam. Connected to the reflector 6 is the plate 10 which is disposed with one end in a cooperatively dimensioned cavity 11 in the reflector 6 and is secured therein by means of adhesive or sealing glass. The plate 10 is provided so that the normal to said plate encloses an angle with the axis of the capillary 1 which is equal to the Brewster angle. The said Brewster angle is approximately 57° and depends on the value of the index of refraction of the material of the plate 10. The achievable degree of polarization is nearly 100% (better than 1000:1). The cavity 11 may be moulded in the reflector during the manufacture or be obtained afterwards by drilling (for example with ultrasonic vibrations).

Replacing the plate 10 can be carried out in a simple and rapid manner by replacing the reflector 6 with accessories.

FIG. 2 shows a manner of connection of the plate 10 of which one end 12 is bent in such manner as to engage the reflector 6. In this case also the plate 10 is connected to the reflector 6 by means of adhesive or sealing glass 14. FIGS. 3 and 4 each show a manner of connecting the plate 10 to the reflector 6 in which one end 12 is present in a cavity 11.

FIG. 5 shows a manner of supporting the plate 10 by means of a supporting member 13 which is secured to the reflector. Several supporting members may be used, or the whole circumference of the plate 10 may be supported with a cylinder which is cut at the Brewster angle and is secured to the reflector 6.

What is claimed is:

1. A gas discharge laser for generating stimulated emission, which comprises: a laser tube, first and second reflectors disposed at the ends of said laser tube, at least one of the said reflectors including means for passing a coherent beam, and a plane parallel transparent plate disposed with a normal thereto enclosing an angle with the axis of said laser tube equal to the Brewster angle, said plate being carried by the other of said reflectors.

2. A gas discharge laser as claimed in claim 1, wherein said plate further includes a holder portion obliquely disposed with respect to the rest of said plate, said holder portion being connected to said other reflector.

3. A gas discharge laser as claimed in claim 1, wherein one peripheral portion of said plate is fixedly engaged in a cooperating cavity in said other reflector.

4. A gas discharge laser as claimed in claim 3, wherein at least a part of the circumference of said plate is supported with one or more supporting means secured to said other reflector.

* * * * *